United States Patent [19]

Shin

[11] Patent Number: 5,236,100

[45] Date of Patent: Aug. 17, 1993

[54] BREATHER PIPE

[75] Inventor: Hyun J. Shin, Inchon, Rep. of Korea

[73] Assignee: Asia Motors Co., Ltd., Seoul, Rep. of Korea

[21] Appl. No.: 916,760

[22] Filed: Jul. 22, 1992

[30] Foreign Application Priority Data

May 28, 1992 [KR] Rep. of Korea ............... 1992-9139

[51] Int. Cl.⁵ .............................................. B65D 90/32
[52] U.S. Cl. ................................... 220/89.1; 220/745
[58] Field of Search ................... 220/89.1, 202, 203,
220/205, 373, 374, 745, 746, 748

[56] References Cited

U.S. PATENT DOCUMENTS

| | | | |
|---|---|---|---|
| 1,709,257 | 4/1929 | Fleming | 220/374 X |
| 1,724,878 | 8/1929 | Jensen | 220/745 X |
| 3,391,818 | 7/1968 | Hairston | 220/373 X |
| 4,666,058 | 5/1987 | Harris | 220/373 |
| 4,798,306 | 1/1989 | Giacomazzi et al. | 220/746 X |
| 4,815,436 | 3/1989 | Sasaki et al. | 220/746 X |
| 4,821,908 | 4/1989 | Yost | 220/746 X |

Primary Examiner—Steven M. Pollard
Attorney, Agent, or Firm—Lowe, Price, LeBlanc & Becker

[57] ABSTRACT

A breather pipe with a leakage checking device for a container which allows air in the container to be ventilated when the mobile container transports high viscosity liquid such as engine fuel of automobiles normally, and on the other hand closes up the breather pipe to prevent a leakage of the liquid when the moving container is accelerated, decelerated or turned rapidly, or inclined or overturned. The breather pipe comprises a pipe member having a lower part which is vertically mounted on an opening formed at an upper surface of the container and an upper part which is curved downwardly. The pipe member also has an upper throat and regularly circumferentially spaced lower depressions formed at the circumferential surface thereof, and a spherical float positioned in the pipe member between the upper throat and the lower depressions.

1 Claim, 4 Drawing Sheets

BREATHER PIPE

BACKGROUND OF THE INVENTION

1. Field of the Invention

The present invention relates to a breather pipe of a mobile container, and more particularly to a leakage checking device for such a breather pipe which allows air to be ventilated through the breather pipe when the mobile container normally transports a high viscosity liquid such as automotive engine fuel, and on the other hand closes up the breather pipe to prevent a leakage of the liquid from the container when the moving container is accelerated, decelerated or turned rapidly, or inclined or overturned.

2. Description of the Prior Art

A breather pipe for a mobile container such as an automobile oil tank, which is generally used to contain viscose liquid, comprises a simple pipe which is vertically mounted to a through hole formed at an upper surface of the container to prevent the liquid from overflowing from the container.

Although the above-mentioned known breather pipe can prevent liquid from overflow from the container while ventilating air as the container moves normally, such a breather pipe cannot prevent overflow of liquid from the moving container is accelerated, decelerated or turned rapidly, or inclined or overturned because the breather pipe is always open to atmosphere.

SUMMARY OF THE INVENTION

Therefore, the present invention has been made in view of the above-described prior art problem and an object of the invention is to provide a device for checking leakage at a breather pipe for a mobile container while allowing air to be ventilated therethrough by providing the breather pipe with a float for opening and closing thereof.

In accordance with the present invention, a breather pipe for a mobile container containing liquid comprises a pipe member having a lower part mounted upright at the area of an opening formed at an upper surface of the container and an upper part which is curved downwardly. The pipe member also has an upper narrow pipe section or throat and a lower suspension means for a float.

The float is positioned in the pipe member and is movable between a first position wherein it rests on a float suspension means allowing the passage of air to and from the container, and a second position wherein it contacts the upper throat to close it.

According to an embodiment of the present invention, the float comprises a spherical body and the float suspension means comprises a plurality of depressions formed regularly and circumferentially on the wall of the pipe member. The float may have other forms such as a cylindrical body with top and bottom hemispheres as long as it allows the ventilation of air in its first position and a sealing engagement with the upper throat in its second position.

According to another embodiment of the present invention the lower float suspension means comprises a throat similar to the upper throat, and the float comprises a cylindrical body having a hemisphere top and a flat bottom. The cylindrical float body is formed with a blind hole at its lower part and diametrical through hole intersecting the blind hole in order to permit the passage of air to and from the container.

BRIEF DESCRIPTION OF THE DRAWINGS

These and other objects, features and advantages of the invention will become more apparent upon a reading of the following detailed description and drawings, in which.

DETAILED DESCRIPTION OF THE PREFERRED EMBODIMENTS

Figure 1:
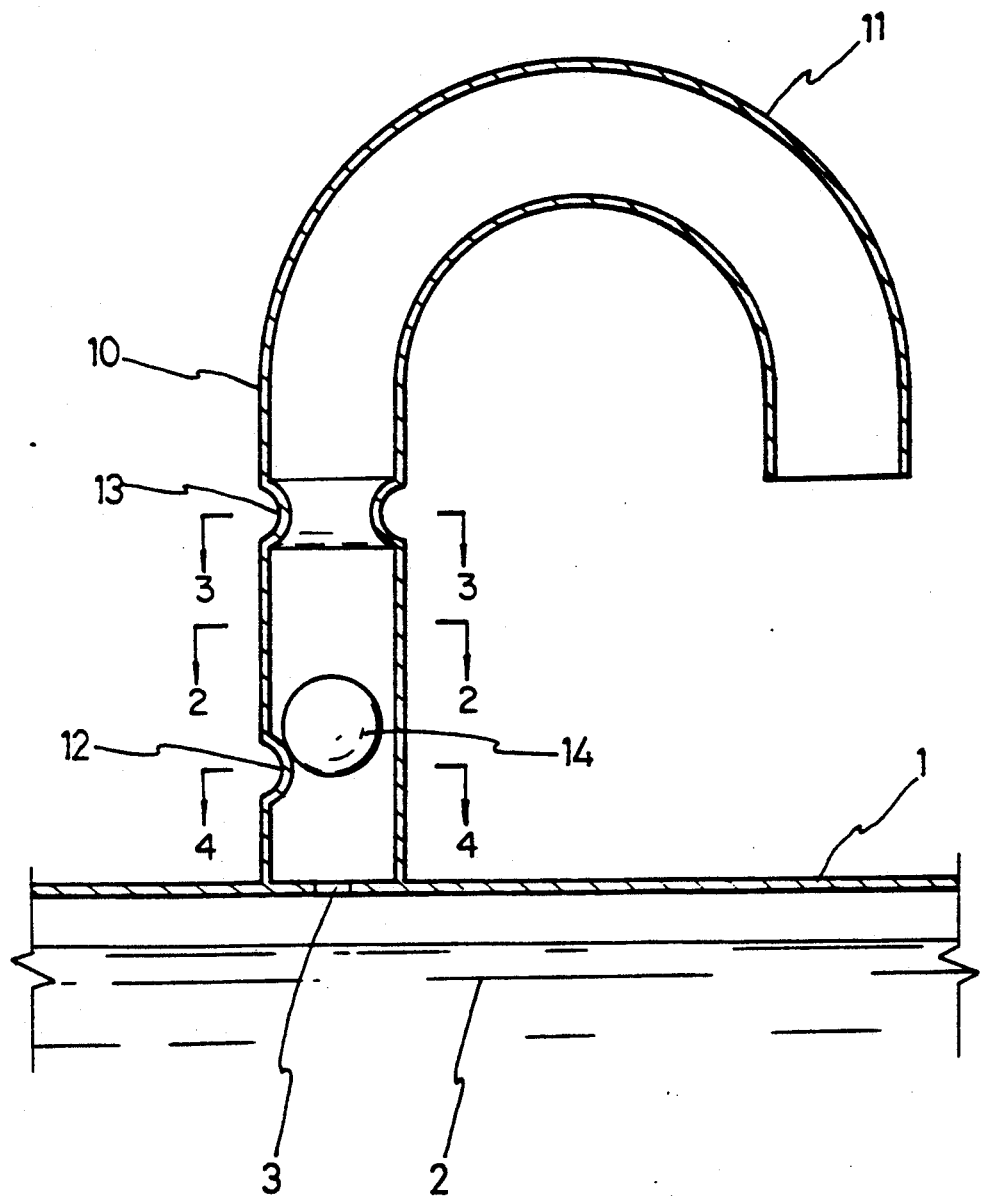
FIG. 1 is a longitudinal sectional view of an embodiment of a leakage checking device for a breather pipe according to the present invention.

The present invention will now be described by referring to FIGS. 1 to 10 in the accompanying drawings, wherein substantially identical or similar elements are designated by the similar reference characters throughout the drawings.

Referring now to FIG. 1, there is shown a breather pipe 11 having a device for checking leakage of liquid according to the present invention. The breather pipe 11 comprises a pipe 10 having an upper part which is curved downwardly and a lower part which is mounted to an opening 3 formed at the upper surface of a container or tank 1 containing viscous liquid. Accordingly, air in the container may be ventilated through the opening 3 and the breather pipe 11 to equalize the pressure in the container 1 with ambient pressure The pipe 10 has a plurality of, for example, three, lower depressions 12 spaced one another at regular circumferential interval at a lower portion thereof so that the inner surface of pipe 10, at which the lower depressions 12 are formed, is protrudes inwardly at three points. A float 14 is positioned in the pipe 10 and is suspended normally by the inward protruded surfaces of three depressions 12. Also, the pipe 10 has an upper narrow section or throat 13 at a given distance from the depressions 12. Hence, the float 14 can be moved upward and downward between the upper throat 13 and the inner surface of the lower depressions 12 and cannot be removed from the pipe 10.

Figure 2:
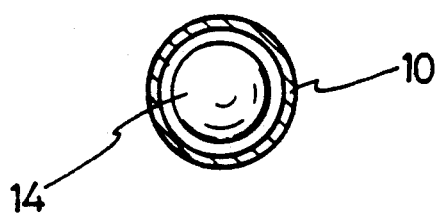
FIG. 2 is a sectional view taken along the line 2—2 of the device shown in FIG. 1.
Figure 3:
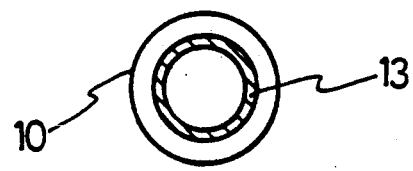
FIG. 3 is a sectional view taken along the line 3—3 of the device shown in FIG. 1.
Figure 4:
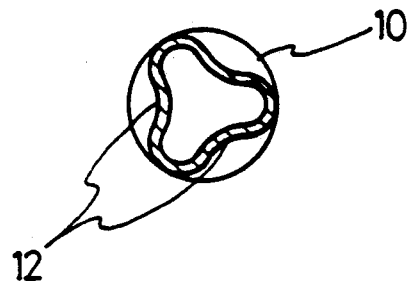
FIG. 4 is a sectional view taken along the line 4—4 of the device shown in FIG. 1.

Referring to FIGS. 2 to 4, there are shown cross sections of the pipe 10 taken along the section lines 2—2, 3—3 and 4—4, respectively. As depicted in FIG. 2, the diameter of the spherical float 14 is smaller than the inner diameter of pipe 10 so that an annular gap is provided therebetween. Accordingly, the air can pass through the gap to the inside and outside of the container 1. As depicted in FIG. 3, the inner diameter of the throat 13 is smaller than the diameter of the float 14 so that the throat 13 is closed up by the float 14 when the float 14 is forced to contact an annular surface of the throat 13. In FIG. 4, the lower depressions 12 are shown as protruded inwardly of the pipe 10 at three points so that the air can be ventilated through the pipe 10 even when the float 14 is disposed on the depressions 12.

Figure 5:
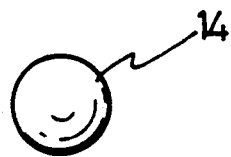
FIG. 5 is an elevational view showing an embodiment of a float used in the device according to the invention.
Figure 6:
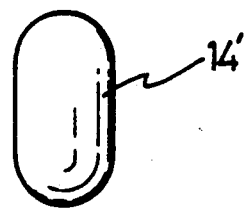
FIG. 6 is an elevational view of another embodiment of a float used in the device according to the invention.

Referring to FIGS. 5 and 6, there are depicted two kinds of embodiments of float, 14 and 14', respectively. The float 14 in FIG. 5 comprises a spherical body, and on the other hand the float 14' in FIG. 6 comprises a cylindrical body having hemispheres at its top and bottom. Therefore, any one of the floats 14 and 14' can block up the pipe 10 simply by contacting with the throat 13. Preferably, the floats 14 and 14' are made of material having lower specific gravity than that of liquid 2 in the container 1 so that it floats always on the liquid 2. Accordingly, the pipe 10 is closed and opened by upward and downward movements of the float 14 or 14'.

The present invention will now be described in operation of the leakage checking device for a breather pipe.

Figure 7:
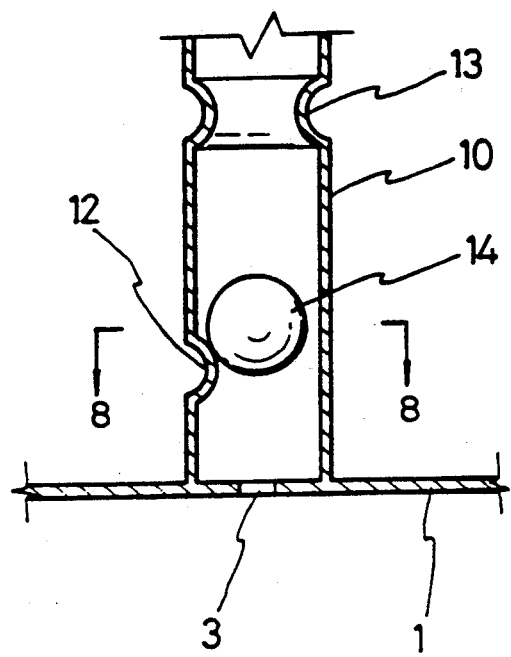
FIG. 7 is a longitudinal sectional view of the device according to the invention, showing a float disposed on the inner surface of lower depressions of the device.
Figure 8:
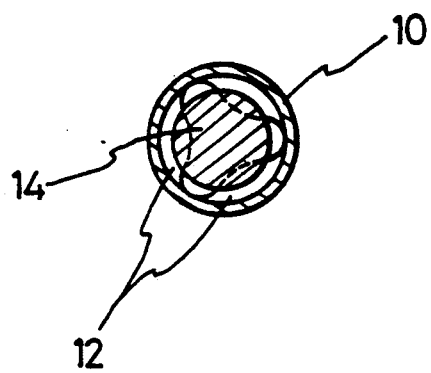
FIG. 8 is a sectional view taken along the line 8—8 of the device in FIG. 7.
Figure 9:
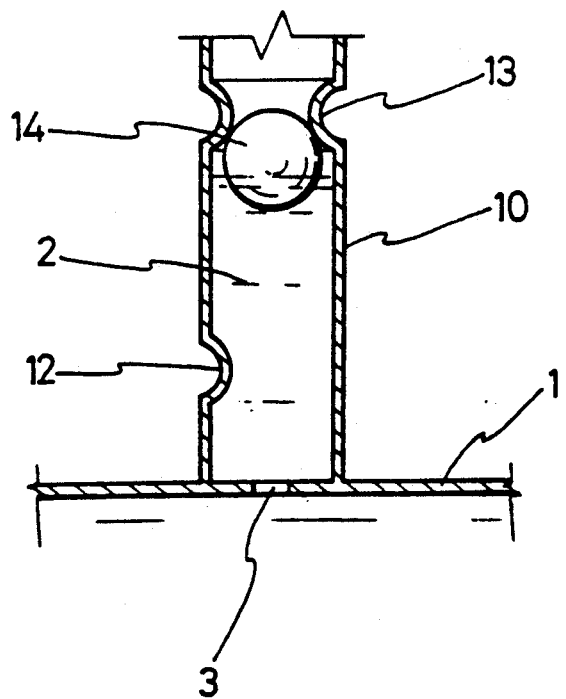
FIG. 9 is a view similar to FIG. 7, of a float body in contact with an upper throat.

With reference to FIGS. 7 and 9, there are shown two states of the float 14, the first state wherein it is disposed on the inner surfaces of the depressions 12 and the second state wherein it is in circular contact with the throat 13. When the container 1 is moved or carried in normal condition i.e., at a constant velocity with the pipe 10 on top the liquid 2 in the tank 1 is maintained at a quiet state and the float 14 is seated on the inner surfaces of the lower depressions 12 of the pipe 10 by its own weight. At this time, the pipe 10 maintains gaps between the inward protruded portions of depressions 12 and the float 14 at three points, as shown in FIG. 8, so that the air can be passed through the gaps to the inside and outside of the container 1.

On the other hand, if the moving container 1 experiences an external force such as by rapid acceleration, rapid deceleration and rapid turn, the liquid 2 in the container 1 enters pipe 10 through the opening 3. Accordingly, the float 14 is raised up by the introduced liquid 2 to contact the throat 13 so that the pipe 10 is closed with the float 14, thereby preventing the liquid 2 in the container 1 from leaking through the pipe 10.

If the liquid 2 introduced into the pipe 10 tends to further rise up by continual external force after the pipe 10 is closed, the pressure of the liquid from the container 1 at the pipe 10 becomes higher than an external atmospheric pressure so that the float 14 is further pressed against the surface of the throat 13. That is, a force tending to press the float body 14 against the throat 13 is expressed by the following relationship:

$$F_c = F_b + (P_d \times A_c) - W_f$$

wherein $F_c$ is the closing force, $F_b$ is a buoyancy of the liquid 2 acting on the float 14, $P_d$ is a pressure difference between the inside and the outside of the container 1, $A_c$ is an area of the container 1 being pressurized and $W_f$ is the weight of the float 14.

Furthermore, when the container 1 is overturned accidentally, the float 14 in the pipe 10 is moved toward the throat 13 by its own weight plus the liquid 2 being introduced through the opening 3 so that the pipe 10 is closed at the area of the throat 13 with the float 14, thereby preventing the liquid 2 from leaking through the pipe 10.

Since the liquid pressure in pipe 10 becomes higher than the external atmospheric pressure upon overturning of the container 1, the float 14 is further pressed against the throat 13 which assures no leakage of the liquid 2 through the pipe. A closing force tending to press the float 14 against the throat 13 is also expressed by the following relation:

$$F_c = W_f + (P_d \times A_c) - F_b$$

wherein $F_c$ is the closing force, $W_f$ is the weight of the float 14, $P_d$ is a pressure difference between the inside and the outside of the container 1, $A_c$ is an area of the container 1 being pressurized and $F_b$ is a buoyancy of the liquid 2 acting on the float 14.

Figure 10:
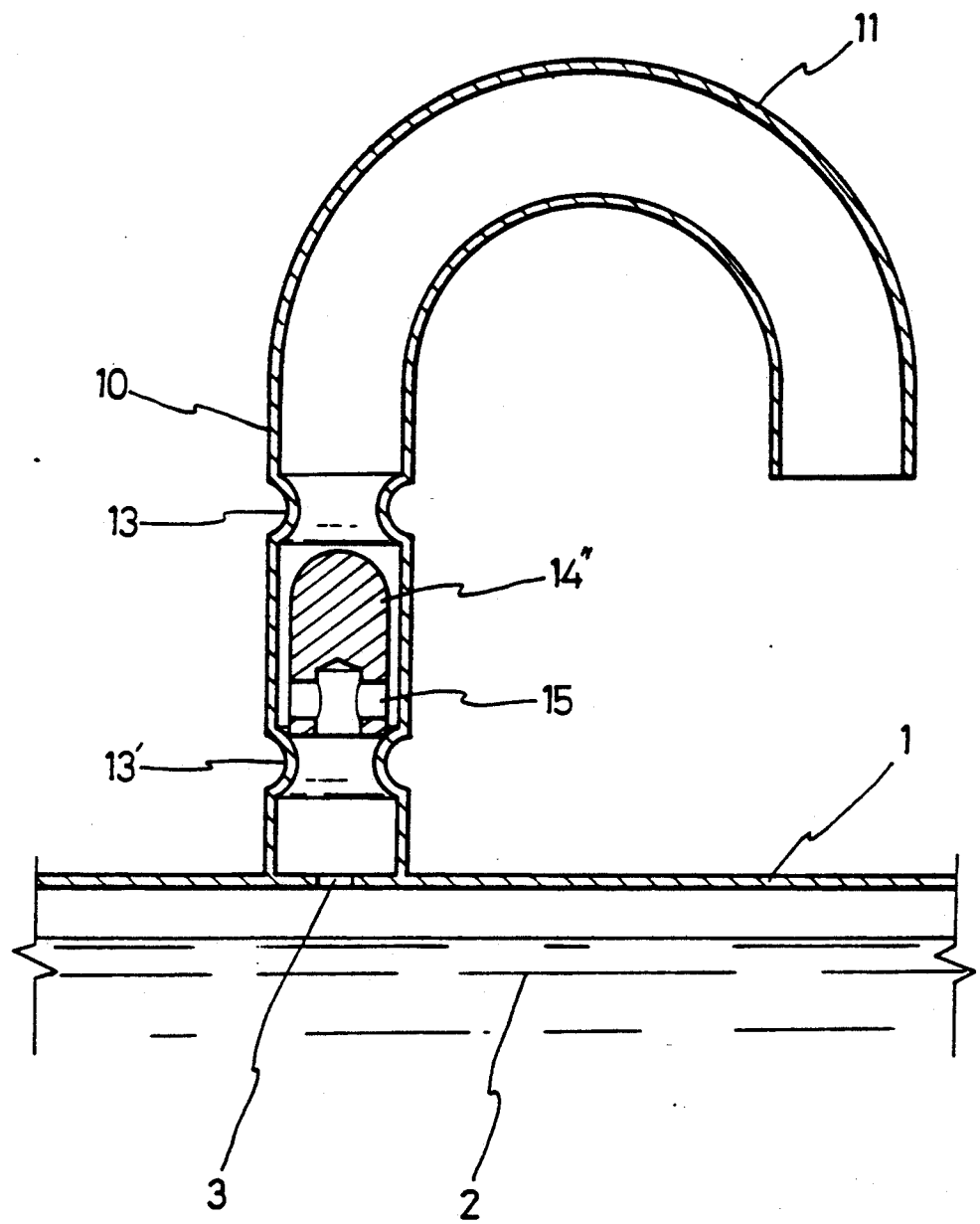
FIG. 10 is a longitudinal sectional view of another embodiment of a leakage checking device for a breather pipe according to the invention.

With reference to FIG. 10, there is depicted another embodiment of the breather pipe with the leakage checking device according to the invention. The breather pipe 11 comprises a pipe 10 having an upper throat 13. Instead of the depressions 12, the pipe 10 of this embodiment has a lower throat 13' similar to the upper throat 13. Also, a float 14" is located between the upper and lower throats 13 and 13'. The float 14" has a cylindrical body which is provided with a hemispherical top and a flat bottom. The float 14" is formed with a blind hole at its lower part and a diametrical through intersecting the blind hole. Accordingly, there is formed a T-shaped hole in the lower part of the float 14".

When the float 14" is disposed on the lower throat 13', air in the container 1 is ventilated through the T-shaped hole. On the other hand, when the float 14" is forced to contact the upper throat 13 by its own weight and/or the pressure of the liquid 2 closing the pipe 10, the liquid 2 in the container 1 is prevented from being leaked through the pipe 10.

As in apparent from the above description, the leakage checking device for a breather pipe of a mobile container according to the present invention comprises a pipe which is mounted on an opening of an upper surface of the container and has an upper throat and a lower depressions, and a spherical float positioned in the pipe between the upper throat and the lower depressions. Therefore, the leakage checking device can allow the air in the container to be ventilated through the opened pipe when the container is in an upright posture and/or in a normal movement, and on the other hand can prevent the liquid from leaking from the container by the blocking action of the float when the container is in an unstable state.

Although the preferred embodiments of the invention have been disclosed for illustrative purpose, those skilled in the art will appreciate that various modifications, additions and substitutions are possible, without departing from the scope and spirit of the invention as disclosed in the accompanying claims. For example, the lower throat 13' in FIG. 10 may be omitted while providing the functions of checking the leakage of liquid as well as the ventilation.

What is claimed is:

1. A breather pipe for a mobile container adapted to contain liquid, comprising:
   a pipe member having a lower part mounted upright at an area of an opening formed at an upper surface of said container, and an upper part which is curved downwardly, said pipe member also having an upper throat and a lower throat therein; and a float which is positioned between the upper and lower throats of the pipe member and is movable between a first position wherein it rests on said lower throat and a second position wherein it contacts said upper throat to close the pipe, said float including a cylindrical body having a hemispherical top and a flat bottom, said cylindrical body being formed with a blind hole at its lower part and a diametrical through hole intersecting said blind hole in order to permit the passage of air to and from said container.

* * * * *